US012548386B2

(12) United States Patent
Takeuchi et al.

(10) Patent No.: US 12,548,386 B2
(45) Date of Patent: Feb. 10, 2026

(54) NOISE GENERATION CAUSE IDENTIFYING METHOD AND NOISE GENERATION CAUSE IDENTIFYING DEVICE

(71) Applicant: TOYOTA JIDOSHA KABUSHIKI KAISHA, Toyota (JP)

(72) Inventors: Shinichi Takeuchi, Nisshin (JP); Atsushi Tabata, Okazaki (JP); Mitsuo Okubo, Okazaki (JP); Shingo Noritake, Owariasahi (JP); Akira Murakami, Kasugai (JP); Ryo Yanagawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 414 days.

(21) Appl. No.: 18/307,842

(22) Filed: Apr. 27, 2023

(65) Prior Publication Data

US 2024/0096145 A1 Mar. 21, 2024

(30) Foreign Application Priority Data

Jun. 7, 2022 (JP) ................................ 2022-092253

(51) Int. Cl.
*G07C 5/08* (2006.01)
*H04R 3/04* (2006.01)

(52) U.S. Cl.
CPC ............. *G07C 5/0808* (2013.01); *H04R 3/04* (2013.01)

(58) Field of Classification Search
None
See application file for complete search history.

(56) References Cited

U.S. PATENT DOCUMENTS

2018/0350167 A1* 12/2018 Ekkizogloy ......... B60R 11/0247
2020/0219477 A1* 7/2020 Honda ............. G10K 11/17881
2021/0302269 A1 9/2021 Tabata et al.
2021/0323562 A1 10/2021 You et al.

FOREIGN PATENT DOCUMENTS

CN 111405416 A * 7/2020 ............... H04S 7/00
JP 2008-228133 A 9/2008
JP 2019-67197 A 4/2019
JP 2021-133005 A 9/2021
JP 2021-154816 A 10/2021

OTHER PUBLICATIONS

Machine translation of CN-111405416-A (Year: 2020).*

* cited by examiner

*Primary Examiner* — Hitesh Patel
*Assistant Examiner* — Sarah A. Mueller
(74) *Attorney, Agent, or Firm* — Oblon, McClelland, Maier & Neustadt, L.L.P.

(57) ABSTRACT

A noise generation cause identifying method and a noise generation cause identifying device are provided. A response correcting process corrects a sound signal obtained through a sound signal obtaining process based on obtained model information so that a frequency response of the obtained sound signal approaches a frequency response of a learning sound signal. A variable obtaining process obtains a variable output from a map by inputting the corrected sound signal to the map. A cause identifying process identifies a generation cause of a sound picked up by a microphone using the variable obtained through the variable obtaining process.

9 Claims, 8 Drawing Sheets

Fig.2

73

| Mobile Company | Model | Frequency Response |
|---|---|---|
| AA Communications | T778 | A-Weighted |
| | T548 | B-Weighted |
| BB Mobile Service | M458 | A-Weighted Plus |
| | M241 | A-Weighted |
| CC Communications | D111 | B-Weighted Plus |
| | D211 | A-Weighted |
| Others | Microphone Type 23 | F-Weighted |

NOISE GENERATION CAUSE IDENTIFYING METHOD AND NOISE GENERATION CAUSE IDENTIFYING DEVICE

BACKGROUND

1. Field

The present disclosure relates to a noise generation cause identifying method and a noise generation cause identifying device.

2. Description of Related Art

Japanese Laid-Open Patent Publication No. 2021-154816 discloses that a map that has undergone machine learning is used to estimate a portion acting as the cause of a sound generated in a vehicle. In the disclosed technique, the map is used to identify a portion serving as a cause of a sound picked up by a microphone.

In the disclosed method, an execution device obtains a variable output from the map by inputting, to the map, a sound signal related to the sound picked up by the microphone and a state variable of a driving system device of the vehicle. Based on the variable output from the map, the execution device identifies the portion acting as the cause of the sound picked up by the microphone.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a first example of a noise generation cause identifying method. The noise generation cause identifying method includes storing, by memory circuitry of an analysis device, mapping data that defines a map. A sound signal related to a sound picked up by a microphone is input to the map and a variable related to a generation cause of a sound in a vehicle is output from the map. The map has undergone machine learning. The sound signal input to the map during the machine learning on the map is a learning sound signal. The microphone that picks up a sound indicated by the learning sound signal is a learning microphone. The method also includes executing, by execution circuitry of the analysis device, a sound signal obtaining process that obtains the sound signal related to the sound picked up by the microphone, obtaining, by the execution circuitry, model information related to a model of the microphone. The method also includes executing, by the execution circuitry, a response correcting process that causes a frequency response of the sound signal to approach a frequency response of the learning sound signal by correcting, based on the obtained model information, the sound signal obtained through the sound signal obtaining process. The method also includes executing, by the execution circuitry, a variable obtaining process that obtains a variable output from the map by inputting the sound signal corrected through the response correcting process to the map, and executing, by the execution circuitry, a cause identifying process that identifies, based on the variable obtained through the variable obtaining process, the generation cause of the sound picked up by the microphone.

The noise generation cause identifying method corrects, based on the model of the microphone, the frequency response of the sound signal related to the sound picked up by the microphone. This reduces the variations in the frequency response of the sound signal that result from the difference in the model of the microphone that picks up the sound. That is, the frequency response of the sound signal input to the map approaches the frequency response of the learning sound signal. Then, the variable output from the map by inputting the corrected sound signal to the map is used to identify the generation cause of the sound picked up by the microphone. This reduces the variations in the accuracy of identifying the generation cause of the sound corresponding to the model of the microphone.

The microphone used to obtain the learning sound signal, which is the sound signal input to the map, during machine learning on the map is referred to as the learning microphone. In some cases, the model of the microphone that picks up the sound generated in the vehicle is different from that of the learning microphone. The frequency response of the model of the microphone is reflected on a sound signal. Thus, when the model of the microphone that picks up the sound generated in the vehicle is different from that of the learning microphone, the frequency response of the sound signal related to the sound picked up by the microphone is deviated from the frequency response of the learning sound signal. Accordingly, the accuracy of identifying a sound-generating portion based on the variable output from the map is not relatively high. This problem is reduced through the above method.

Another aspect of the present disclosure provides a second example of a noise generation cause identifying method. A noise generation cause identifying method includes storing, by memory circuitry of an analysis device, mapping data that defines a map. A sound signal related to a sound picked up by a microphone is input to the map and a variable related to a generation cause of a sound in a vehicle is output from the map. The map has undergone machine learning. The sound signal input to the map during the machine learning on the map is a learning sound signal. The microphone that picks up a sound indicated by the learning sound signal is a learning microphone. The method also includes executing, by execution circuitry of the analysis device, a sound signal obtaining process that obtains the sound signal related to the sound picked up by the microphone, obtaining, by the execution circuitry, model information related to a model of the microphone. The method also includes executing, by the execution circuitry, a first response correcting process that corrects a frequency response of the sound signal obtained through the sound signal obtaining process and, when the model information related to the microphone is first model information, causes the frequency response of the sound signal to approach a frequency response of the learning sound signal, executing, by the execution circuitry, a second response correcting process that corrects the frequency response of the sound signal obtained through the sound signal obtaining process and, when the model information related to the microphone is second model information, causes the frequency response of the sound signal to approach the frequency response of the learning sound signal. The method also includes executing, by the execution circuitry, a variable obtaining process that obtains, as a first output variable, a variable output from the map by inputting the sound signal corrected through the first response correcting process to the map, obtains, as a second output variable, a variable output from the map by inputting the sound signal corrected through the second response correcting process to the map, and obtains, as a third output variable, a variable output from the map by inputting the sound signal obtained through the sound signal obtaining process to the map. The method also includes executing, by the execution circuitry, a cause selecting process that selects the generation cause of the sound from a generation cause of the sound that is based on the first output variable, a generation cause of the sound that is based on the second output variable, and a generation cause of the sound that is based on the third output variable.

The noise generation cause identifying method executes the first response correcting process and the second response correcting process. Subsequently, the variable obtaining process is executed to obtain the first output variable, the second output variable, and the third output variable. Then, the generation cause of the sound is selected from the generation cause identified from the first output variable, the generation cause identified from the second output variable, and the generation cause identified from the third output variable. As compared to a configuration in which only one of the generation cause identified from the first output variable, the generation cause identified from the second output variable, and the generation cause identified from the third output variable is obtained and the obtained generation cause is identified as the generation cause, the above method limits a decrease in the accuracy of identifying the generation cause of the sound obtained by the microphone. This reduces the variations in the accuracy of identifying the generation cause of the sound corresponding to the model of the microphone.

A further aspect of the present disclosure provides a first example of a noise generation cause identifying device. The noise generation cause identifying device identifies a generation cause of a sound picked up by a microphone. The noise generation cause identifying device includes execution circuitry and memory circuitry. The memory circuitry stores mapping data that defines a map. A sound signal related to the sound picked up by the microphone is input to the map and a variable related to a generation cause of a sound in a vehicle is output from the map. The map has undergone machine learning. The sound signal input to the map during the machine learning on the map is a learning sound signal. The microphone that picks up a sound indicated by the learning sound signal is a learning microphone. The execution circuitry is configured to execute a response correcting process that performs correction corresponding to model information related to a model of the microphone so that a frequency response of the sound signal related to the sound picked up by the microphone approaches a frequency response of the learning sound signal. A variable obtaining process obtains a variable output from the map by inputting the sound signal corrected through the response correcting process to the map. A cause identifying process identifies, based on the variable obtained through the variable obtaining process, the generation cause of the sound picked up by the microphone.

The noise generation cause identifying device provides the operation and advantages that are equivalent to those of the first example of the noise generation cause identifying method.

Yet another aspect of the present disclosure provides a second example of a noise generation cause identifying device. The noise generation cause identifying device identifies a generation cause of a sound picked up by a microphone. The noise generation cause identifying device includes execution circuitry and memory circuitry. The memory circuitry stores mapping data that defines a map. A sound signal related to the sound picked up by the microphone is input to the map and a variable related to a generation cause of a sound in a vehicle is output from the map. The map has undergone machine learning. The sound signal input to the map during the machine learning on the map is a learning sound signal. The microphone that picks up a sound indicated by the learning sound signal is a learning microphone. The execution circuitry executes a first response correcting process that corrects a frequency response of the sound signal related to the sound picked up by the microphone. When the model information related to the microphone is first model information, the first response correcting process causes the frequency response of the sound signal to approach a frequency response of the learning sound signal. A second response correcting process corrects the frequency response of the sound signal. When the model information related to the microphone is second model information, the second response correcting process causes the frequency response of the sound signal to approach the frequency response of the learning sound signal. A variable obtaining process obtains, as a first output variable, a variable output from the map by inputting the sound signal corrected through the first response correcting process to the map. The variable obtaining process obtains, as a second output variable a variable output from the map by inputting the sound signal corrected through the second response correcting process to the map. The variable obtaining process obtains, as a third output variable, a variable output from the map by inputting a sound signal that has not been corrected to the map. A cause selecting process selects the generation cause of the sound from a generation cause of the sound that is based on the first output variable, a generation cause of the sound that is based on the second output variable, and a generation cause of the sound that is based on the third output variable.

The noise generation cause identifying device provides the operation and advantages that are equivalent to those of the second example of the noise generation cause identifying method.

Other features and aspects will be apparent from the following detailed description, the drawings, and the claims.

BRIEF DESCRIPTION OF DRAWINGS

FIG. 2 is a table showing model data of the microphone shown in FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A noise generation cause identifying method, a noise generation cause identifying process, and a noise generation cause identifying device according to a first embodiment will now be described with reference to FIGS. 1 to 7.

Figure 1:
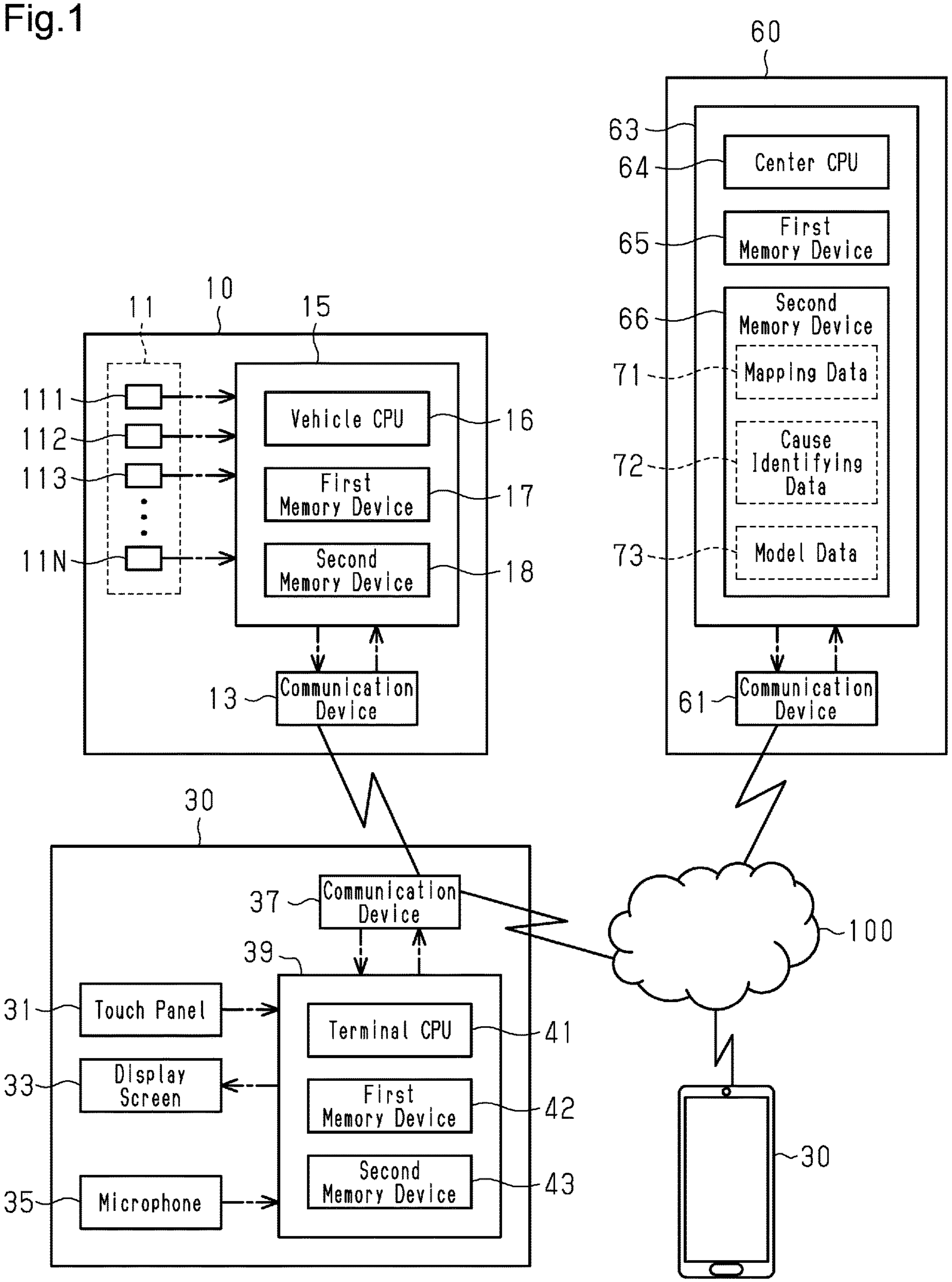
FIG. 1 is a block diagram showing the configuration of a system according to a first embodiment of the present disclosure.

FIG. 1 shows a vehicle 10, a mobile terminal 30 owned by an occupant of the vehicle 10, and a data analysis center 60 located outside of the vehicle 10.

Vehicle

The vehicle 10 includes a detection system 11, a vehicle communication device 13, and a vehicle controller 15.

The detection system 11 includes N sensors 111, 112, 113, . . . , 11N. N is an integer greater than or equal to 4. The sensors 111 to 11N each output a signal corresponding to the detection result to the vehicle controller 15. The sensors 111 to 11N include a sensor that detects a vehicle state quantity (e.g., vehicle speed or acceleration) and a sensor that detects an operation amount (e.g., accelerator operation amount or braking operation amount) of the occupant. The sensors 111 to 11N may include a sensor that detects the operating state of a driving device (e.g., engine or electric motor) of the vehicle 10 and a sensor that detects the temperature of coolant or oil.

The vehicle communication device 13 communicates with the mobile terminal 30 that is carried into the passenger compartment of the vehicle 10. The vehicle communication device 13 outputs, to the vehicle controller 15, the information received from the mobile terminal 30 and sends, to the mobile terminal 30, the information output from the vehicle controller 15.

The vehicle controller 15 controls the vehicle 10 based on output signals of the sensors 111 to 11N. That is, the vehicle controller 15 activates the driving device, a braking device, a steering device, and the like of the vehicle 10 to control the travel speed, acceleration and yaw rate of the vehicle 10.

The vehicle controller 15 includes a vehicle CPU 16, a first memory device 17, and a second memory device 18. The first memory device 17 is memory circuitry that stores various control programs executed by the vehicle CPU 16. The first memory device 17 also stores vehicle type information, which is related to the vehicle types and grades of the vehicle 10. The second memory device 18 is memory circuitry that stores the results of calculation executed by the vehicle CPU 16.

Mobile Terminal

The mobile terminal 30 is, for example, a smartphone or a tablet terminal. The mobile terminal 30 includes a touch panel 31, a display screen 33, a microphone 35, a terminal communication device 37, and a terminal controller 39. The touch panel 31 is a user interface placed over the display screen 33. When the mobile terminal 30 is carried into the passenger compartment, the microphone 35 can pick up a sound transmitted to the passenger compartment.

The terminal communication device 37 functions to communicate with the vehicle 10 when the mobile terminal 30 is located in the passenger compartment of the vehicle 10. The terminal communication device 37 outputs, to the terminal controller 39, the information received from the vehicle controller 15 and sends, to the vehicle controller 15, the information output from the terminal controller 39.

Further, the terminal communication device 37 functions to communicate with another mobile terminal 30 and another data analysis center 60 via a global network 100. The terminal communication device 37 outputs, to the terminal controller 39, the information received from that mobile terminal 30 or that data analysis center 60 and sends, to that mobile terminal 30 or that data analysis center 60, the information output by the terminal controller 39.

The terminal controller 39 includes a terminal CPU 41, a first memory device 42, and a second memory device 43. In the present embodiment, the terminal controller 39 is an example of an analysis device. The terminal CPU 41 is an example of execution circuitry of the analysis device. The execution circuitry corresponds to an execution device. The terminal CPU 41 corresponds to first execution circuitry. The first execution circuitry corresponds to a first execution device. The first memory device 42 is memory circuitry that stores various control programs executed by the terminal CPU 41. The first memory device 42 also stores model information related to the model of the microphone 35 of the mobile terminal 30. The second memory device 43 is memory circuitry that stores the results of calculation executed by the terminal CPU 41.

Data Analysis Center

The data analysis center 60 corresponds to a noise generation cause identifying device that identifies a generation cause of the sound picked up by the microphone 35. There may be M causes for generating noise in the vehicle 10. M is an integer greater than or equal to 2. The data analysis center 60 selects one of the candidates for the M causes.

The data analysis center 60 includes a center communication device 61 and a center controller 63.

The center communication device 61 functions to communicate with multiple mobile terminals 30 via the global network 100. The center communication device 61 outputs, to the center controller 63, the information received from the mobile terminal 30 and sends, to the mobile terminal 30, the information output from the center controller 63.

The center controller 63 includes a center CPU 64, a first memory device 65 and a second memory device 66. In the present embodiment, the center controller 63 is an example of the analysis device. The center CPU 64 is an example of the execution circuitry of the analysis device and corresponds to the second execution circuitry. The second memory device 66 corresponds to the memory circuitry of the analysis device. The center CPU 64 corresponds to the execution circuitry of the noise generation cause identifying device. The second memory device 66 corresponds to the memory circuitry of the noise generation cause identifying device.

The first memory device 65 is memory circuitry that stores various control programs executed by the center CPU 64.

The second memory device 66 is memory circuitry that stores mapping data 71 that defines a map that has undergone machine learning. The map is a learned model that outputs a variable used to identify the generation cause of a sound in the vehicle 10 when an input variable is input to the map. The map is, for example, a function approximator. The map is, for example, a fully-connected feedforward neural network in which the number of intermediate layer is one.

An output variable y of the map will now be described. As described above, the vehicle 10 has the M generation cause candidates for noise. Thus, when input variables are input to the map, the M output variables y(1), y(2), . . . , y(M) are output from the map. An actual generation cause is referred to as an actual cause. The output variable y(1) indicates the probability that the actual cause is a first generation cause candidate of the M generation cause candidates. The output variable y(2) indicates the probability that the actual cause is a second generation cause candidate of the M generation cause candidates. The output variable y(M) indicates the probability that the actual cause is a Mth generation cause candidate of the M generation cause candidates.

The second memory device 66 is memory circuitry that stores cause identifying data 72. The cause identifying data 72 is used to identify the generation cause of a sound in the vehicle 10 based on the output variable y of the map. The cause identifying data 72 stores the M generation cause candidates. Of the M generation cause candidates, the first generation cause candidate corresponds to the output variable y(1). Of the M generation cause candidates, the second generation cause candidate corresponds to the output variable y(2). Of the M generation cause candidates, the Mth generation cause candidate corresponds to the output variable y(M).

The second memory device 66 stores model data 73. The model data 73 include model information related to multiple types of microphones.

FIG. 2 shows an example of the model data 73. The model data 73 of FIG. 2 includes the model information related to the following microphones.

- Model information indicating that the frequency response of the microphone of a mobile terminal model T778 produced by AA Communications is A-weighted.
- Model information indicating that the frequency response of the microphone of a mobile terminal model T548 produced by AA Communications is B-weighted.
- Model information indicating that the frequency response of the microphone of a mobile terminal model M458 produced by BB Mobile Service is A-weighted plus.
- Model information indicating that the frequency response of the microphone of a mobile terminal model M241 produced by BB Mobile Service is A-weighted.
- Model information indicating that the frequency response of the microphone of a mobile terminal model D111 produced by CC Communications is B-weighted plus.
- Model information indicating that the frequency response of the microphone of a mobile terminal model D211 produced by CC Communications is A-weighted.
- Model information indicating that the frequency response of another microphone model Type 23 is F-weighted.

The frequency band of a sound that can be readily picked up by a microphone and the frequency band of a sound that cannot be readily picked up by the microphone differ depending on the microphone model. Such a response of the microphone corresponds to the frequency response of the microphone.

As will be described in detail later, the microphone of a Type 23 model is used during machine learning on a map. In this case, the microphone of the Type 23 model corresponds to a learning microphone 35A (refer to FIG. 7).

Noise Generation Cause Identifying Method

Figure 3:
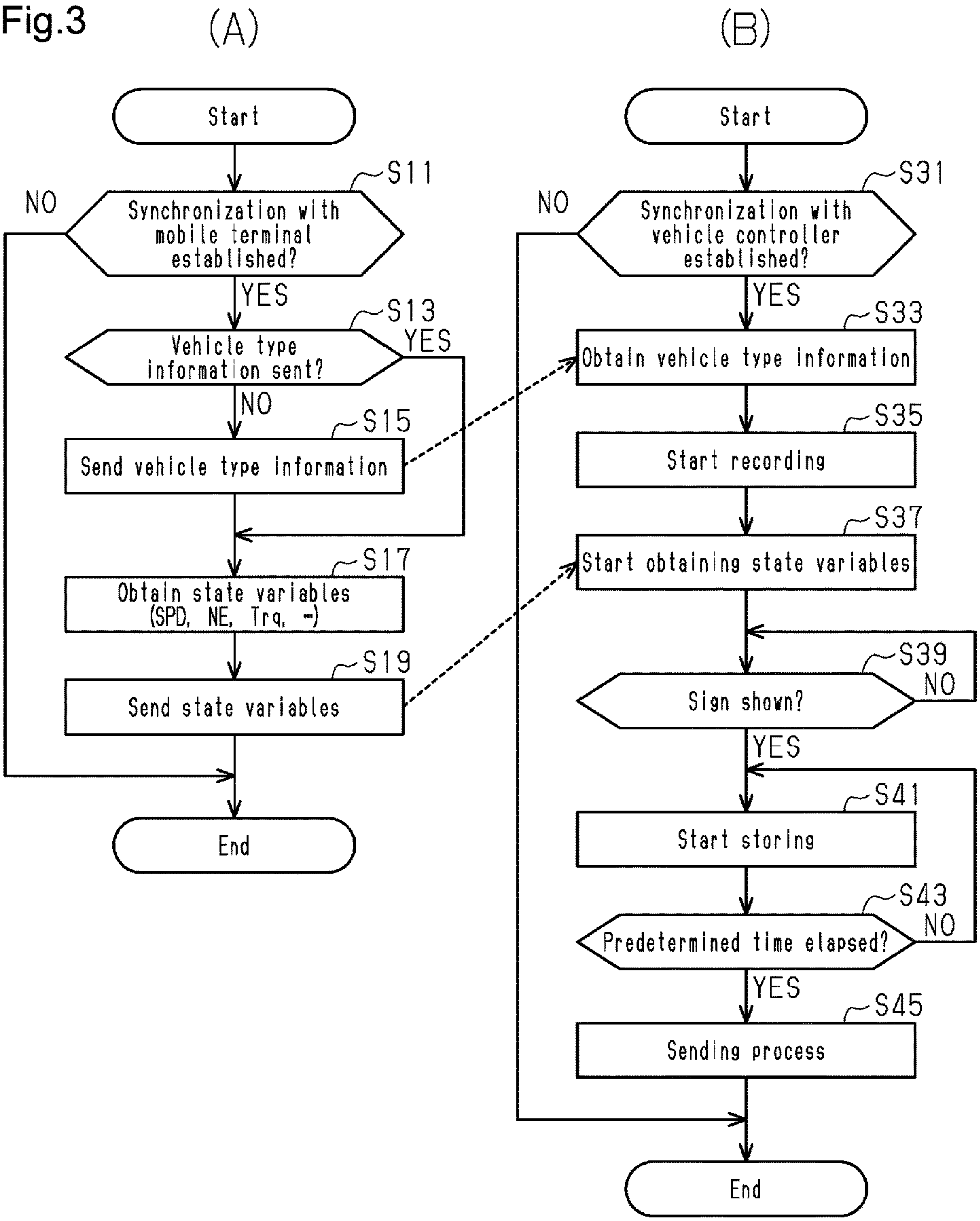
In FIG. 3, section (A) is a flowchart illustrating the flow of a series of processes executed by the vehicle controller of FIG. 1, and section (B) is a flowchart illustrating the flow of the series of processes executed by the mobile terminal of FIG. 1.

The noise generation cause identifying method will now be described with reference to FIGS. 3 to 6. Section (A) of FIG. 3 illustrates the flow of processes executed by the vehicle CPU 16 of the vehicle controller 15. A series of processes illustrated in section (A) of FIG. 3 are repeatedly executed by the vehicle CPU 16 executing the control programs stored in the first memory device 17.

In the series of processes illustrated in section (A) of FIG. 3, in step S11, the vehicle CPU 16 determines whether synchronization with the mobile terminal 30 is established. When determining that the synchronization with the mobile terminal 30 is established (S11: YES), the vehicle CPU 16 advances the process to step S13. When determining that the synchronization with the mobile terminal 30 is not established (S11: NO), the vehicle CPU 16 temporarily ends the series of processes.

In step S13, the vehicle CPU 16 determines whether the vehicle type information of the vehicle 10 has been sent to the mobile terminal 30. When determining that the vehicle type information of the vehicle 10 has been sent to the mobile terminal 30 (S13: YES), the vehicle CPU 16 advances the process to step S17. When determining that the vehicle type information of the vehicle 10 has not been sent to the mobile terminal 30 (S13: NO), the vehicle CPU 16 advances the process to step S15. In step S15, the vehicle CPU 16 causes the vehicle communication device 13 to send the vehicle type information of the vehicle 10 to the mobile terminal 30. Then, the vehicle CPU 16 advances the process to step S17.

In step S17, the vehicle CPU 16 obtains the state variables of the vehicle 10. Specifically, the vehicle CPU 16 obtains, as the state variables of the vehicle 10, detection values of the sensors 111 to 11N and processed values of the detection values. For example, the vehicle CPU 16 obtains a travel speed SPD of the vehicle 10, an acceleration G of the vehicle 10, an engine rotation speed NE, an engine torque Trq, and the like as the state variables of the vehicle 10.

In step S19, the vehicle CPU 16 causes the vehicle communication device 13 to send the obtained state variables of the vehicle 10 to the mobile terminal 30. Then, the vehicle CPU 16 temporarily ends the series of processes.

Section (B) of FIG. 3 illustrates the flow of processes executed by the terminal CPU 41 of the terminal controller 39. A series of processes illustrated in section (B) of FIG. 3 are repeatedly executed by the terminal CPU 41 executing the control programs stored in the first memory device 42.

In the series of processes illustrated in section (B) of FIG. 3, in step S31, the terminal CPU 41 determines whether synchronization with the vehicle controller 15 is established. When determining that the synchronization with the vehicle controller 15 is established (S31: YES), the terminal CPU 41 advances the process to step S33. When determining that the synchronization with the vehicle controller 15 is not established (S31: NO), the terminal CPU 41 temporarily ends the series of processes.

In step S33, the terminal CPU 41 obtains the vehicle type information sent from the vehicle controller 15. In step S35, the terminal CPU 41 starts recording with the microphone

35. In step S37, the terminal CPU 41 starts obtaining the state variables of the vehicle 10 that have been sent from the vehicle controller 15.

In step S39, the terminal CPU 41 determines whether a notice sign is shown. The notice sign indicates that the noise generated in the vehicle 10 has been noticed by the occupant of the vehicle 10. For example, when the occupant performs a predetermined notice operation (a predetermined operation defined in advance) for the mobile terminal 30, the terminal CPU 41 determines that the notice sign is shown. In contrast, when the occupant does not perform the predetermined notice operation for the mobile terminal 30, the terminal CPU 41 determines that the notice sign is not shown. When determining that the notice sign is shown (S39: YES), the terminal CPU 41 advances the process to step S41. When determining that the notice sign is not shown (S39: NO), the terminal CPU 41 repeats the determination of step S39 until determining that the notice sign is shown.

Figure 4:
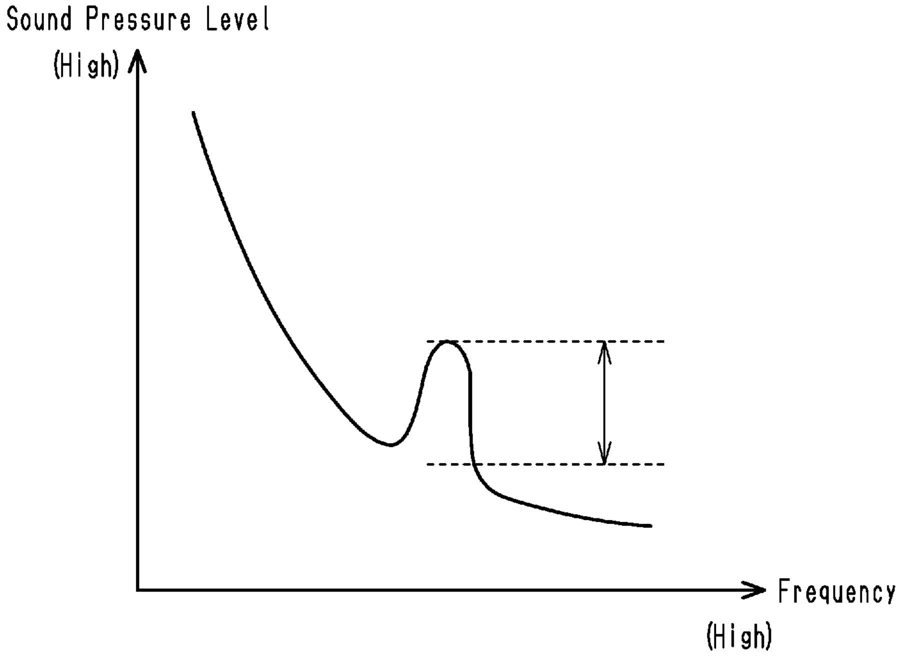
FIG. 4 is a graph showing an example of the sound signal of the sound picked up by the microphone of the mobile terminal of FIG. 1.

FIG. 4 illustrates an example of the noise generated in the vehicle 10. When the noise of FIG. 4 is generated, the occupant of the vehicle 10 may feel uncomfortable by the noise. For example, there is a peak that stands out from a gentle curve representing the relationship between a sound pressure level and a frequency in FIG. 4. In such a case, the occupant may perform the predetermined notice operation for the mobile terminal 30.

Referring back to section (B) of FIG. 3, in step S41, the terminal CPU 41 starts storing the state variables of the vehicle 10 obtained from the vehicle controller 15 and a sound signal. The sound signal relates to a sound picked up by the microphone 35. In this step, the terminal CPU 41 causes the second memory device 43 to store the sound signal and the state variables in association with each other. That is, step S41 corresponds to a sound signal obtaining process. In step S43, the terminal CPU 41 determines whether the time elapsed from when it was determined that the notice sign has been shown is greater than a predetermined time. When the elapsed time is not greater than the predetermined time (S43: NO), the terminal CPU 41 returns the process to step S41. That is, the terminal CPU 41 continues the process that causes the second memory device 43 to store the sound signal and the state variables. When the elapsed time is greater than the predetermined time (S43: YES), the terminal CPU 41 advances the process to step S45.

In step S45, the terminal CPU 41 executes a sending process. That is, in the sending process, the terminal CPU 41 causes the terminal communication device 37 to send, to the data analysis center 60, time-series data of the sound signal and time-series data of the state variables of the vehicle 10 that are stored in the second memory device 43. Further, in the sending process, the terminal CPU 41 causes the terminal communication device 37 to send, to the data analysis center 60, the vehicle type information obtained in step S33 and the model information related to the microphone 35 of the mobile terminal 30. When the sending is completed, the terminal CPU 41 temporarily ends the series of processes.

Figure 5:
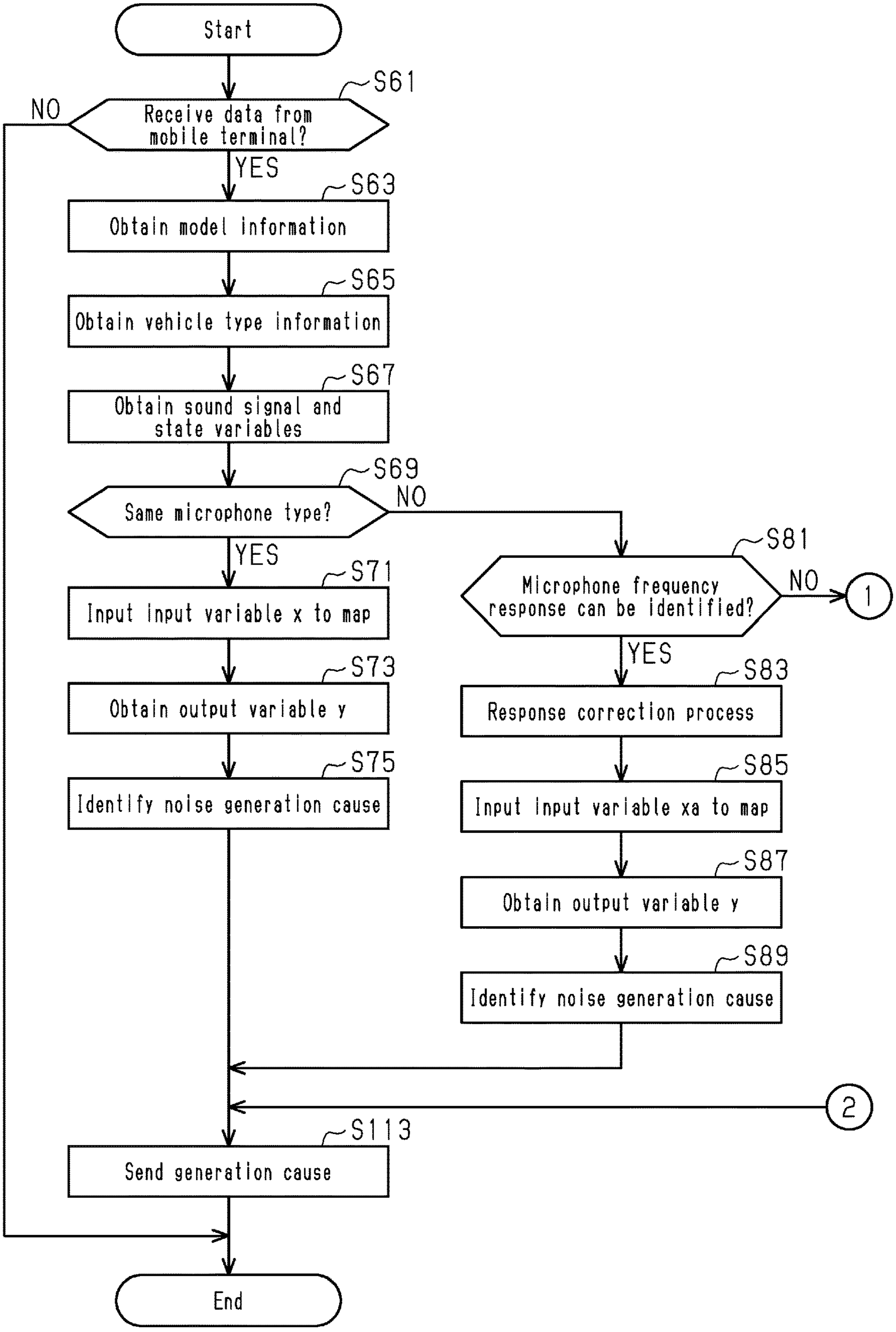
FIG. 5 is a flowchart illustrating part of the flow of the series of processes executed by the center controller of FIG. 1.
Figure 6:
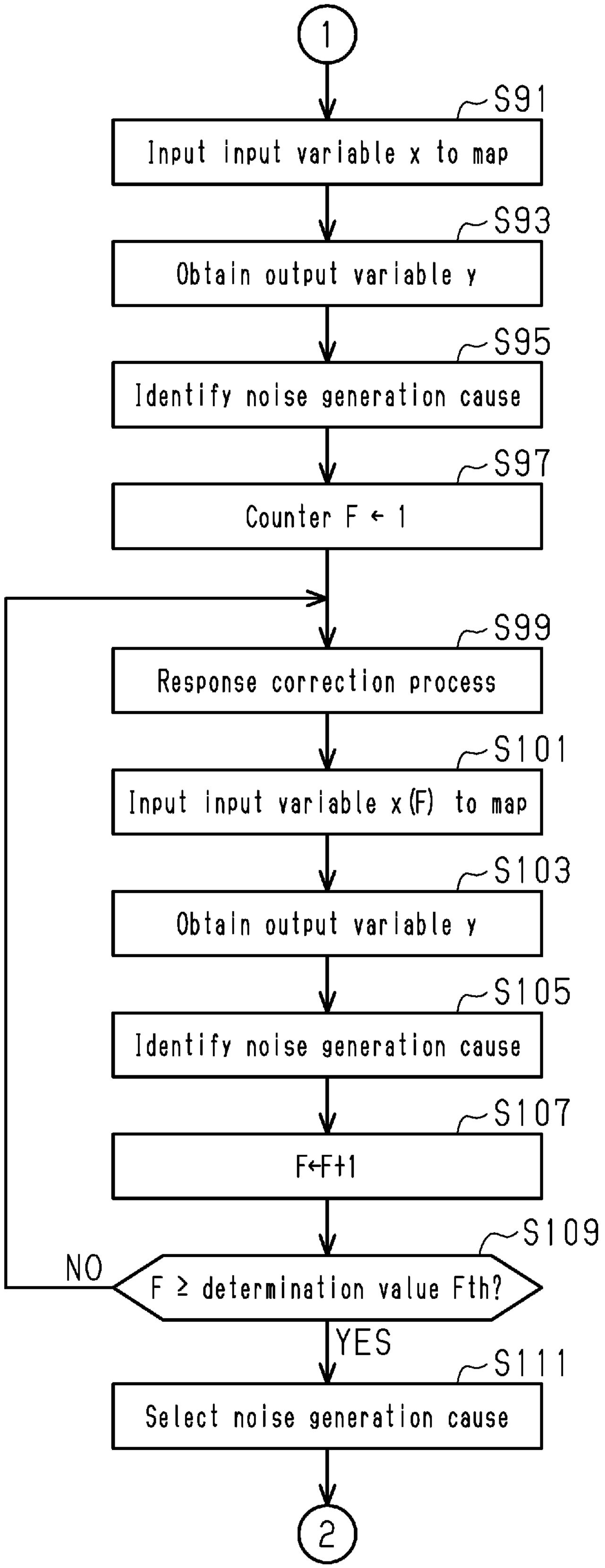
FIG. 6 is a flowchart illustrating the remainder of the flow of the series of processes executed by the center controller subsequent to FIG. 5.

FIGS. 5 and 6 each illustrate the flow of processes executed by the center CPU 64 of the center controller 63. A series of processes illustrated in FIGS. 5 and 6 are repeatedly executed by the center CPU 64 executing the control programs stored in the first memory device 65.

In the series of processes, in step S61, the center CPU 64 determines whether the data sent to the data analysis center 60 by the mobile terminal 30 in step S45 is received by the center communication device 61. When the data is received by the center communication device 61 (S61: YES), the center CPU 64 advances the process to step S63. When the data is not received by the center communication device 61 (S61: NO), the center CPU 64 temporarily ends the series of processes.

In step S63, the center CPU 64 obtains the model information of the microphone 35 received by the center communication device 61. That is, step S63 corresponds to a model information obtaining process.

In step S65, the center CPU 64 obtains the vehicle type information of the vehicle 10 received by the center communication device 61. In step S67, the center CPU 64 obtains the time-series data of the sound signal and the time-series data of the state variables of the vehicle 10 received by the center communication device 61.

In step S69, the center CPU 64 determines whether the model of the microphone 35 indicated by the model information obtained in step S63 is the same as that of the learning microphone 35A. In the present embodiment, the frequency response of the learning microphone 35A is F-weighted, which is shown in FIG. 2. Thus, when the frequency response of the microphone 35 indicated by the model information is F-weighted, the center CPU 64 determines that the model of the microphone 35 is the same as that of the learning microphone 35A. When the frequency response of the microphone 35 indicated by the model information is not F-weighted, the center CPU 64 determines that the model of the microphone 35 is different from that of the learning microphone 35A. When determining that the model of the microphone 35 is the same as that of the learning microphone 35A (S69: YES), the center CPU 64 advances the process to step S71. When determining that the model of the microphone 35 is different from that of the learning microphone 35A (S69: NO), the center CPU 64 advances the process to step S81.

In step S71, the center CPU 64 inputs the time-series data of the sound signal and the time-series data of the state variables of the vehicle 10, which were obtained in step S67, to the map as an input variable x. In step S73, the center CPU 64 obtains the output variable y output from the map. That is, in the process of step S73, when the model of the microphone 35 is the same as that of the microphone 35A, the output variable y output from the map is obtained by inputting a non-corrected sound signal to the map. Accordingly, step S73 corresponds to a reference variable obtaining process. The output variable y of step S73 corresponds to a reference variable.

When the acquisition of the output variable y by the center CPU 64 is completed in step S73, the center CPU 64 advances the process to step S75. In step S75, the center CPU 64 uses the output variable y obtained in step S73 to identify the generation cause of the sound picked up by the microphone 35. Specifically, the center CPU 64 selects the output variable having the largest value from the M output variables y(1), y(2), . . . , y(M). Using the cause identifying data 72, the center CPU 64 identifies the generation cause candidate corresponding to the selected output variable as an actual candidate. Accordingly, step S75 corresponds to a second cause identifying process. Then, the center CPU 64 advances the process to step S113.

In step S81, the center CPU 64 determines whether the frequency response of the microphone 35 can be identified. For example, when the model indicated by the model information of the microphone is included in the model data 73 of FIG. 2, the center CPU 64 can identify the frequency response of the microphone 35. When the model indicated by the model information of the microphone is included in not the model data 73, the center CPU 64 cannot identify the frequency response of the microphone 35. When determining that the frequency response of the microphone 35 can be identified (step S81: YES), the center CPU 64 advances the process to step S83. When determining that the frequency response of the microphone 35 cannot be identified (step S81: NO), the center CPU 64 advances the process to step S91. That is, when the model information related to the microphone 35 is included in the model data 73 of FIG. 2 (i.e., the model information related to the microphone 35 is stored in the second memory device 66), the center CPU 64 advances the process to step S83. When the model information related to the microphone 35 is not included in the model data 73 (i.e., the model information related to the microphone 35 is not stored in the second memory device 66), the center CPU 64 advances the process to step S91.

In step S83, the center CPU 64 performs correction corresponding to the model information related to the microphone 35 to execute a response correcting process that causes the frequency response of the sound signal to approach the frequency response of a learning sound signal. The learning sound signal, which will be described in detail, is a sound signal that is input to the map during machine learning on the map. The sound indicated by the learning sound signal is picked up by the learning microphone 35A. Thus, in step S83, the center CPU 64 executes the response correcting process corresponding to the model information related to the microphone 35. That is, when the model information related to the microphone 35 is first model information, the center CPU 64 executes the response correcting process corresponding to the frequency response of the microphone 35 indicated by the first model information. That is, when the model information related to the microphone 35 is second model information, the center CPU 64 executes the response correcting process corresponding to the frequency response of the microphone 35 indicated by the second model information.

An example of the response correcting process will now be described. The frequency response of the learning microphone 35A has a relatively high sensitivity to low-frequency-band sounds and has a relatively low sensitivity to high-frequency-band sounds. In contrast, the frequency response of the microphone 35 has a relatively low sensitivity to low-frequency-band sounds and has a relatively high sensitivity to high-frequency-band sounds. In this case, the frequency response of the learning sound signal has a relatively high sensitivity to low-frequency-band sounds and has a relatively low sensitivity to high-frequency-band sounds in the same manner as the frequency response of the learning microphone 35A. In contrast, the frequency response of the sound signal related to the sound picked up by the microphone 35 has a relatively low sensitivity to low-frequency-band sounds and has a relatively high sensitivity to high-frequency-band sounds in the same manner as the frequency response of the microphone 35. Thus, in the response correcting process, the center CPU 64 corrects the sound signal such that the sound pressure level of a low-frequency-band sound increases and the sound pressure level of a high-frequency-band sound decreases. Thus, the center CPU 64 can cause the frequency response of the sound signal to approach that of the learning sound signal.

In the present embodiment, the response correcting process includes multiple response correcting processes. Thus, when the model information related to the microphone 35 is the first model information, the center CPU 64 executes a first response correcting process as the response correcting process for the first model information. Thus, when the model information related to the microphone 35 is the second model information, the center CPU 64 executes a second response correcting process as the response correcting process for the second model information. The first response correcting process is a process that allows the frequency response of the sound signal to approach that of the learning sound signal when the model information related to the microphone 35 is the first model information. The second response correcting process is a process that allows the frequency response of the sound signal to approach that of the learning sound signal when the model information related to the microphone 35 is the second model information.

After correcting the sound signal through the response correcting process, the center CPU 64 advances the process to step S85. In step S85, the center CPU 64 inputs the time-series data of the corrected sound signal corrected in step S83 and the time-series data of the state variables of the vehicle 10 obtained in step S67 to the map as an input variable xa. In step S87, the center CPU 64 obtains the output variable y of the map. That is, step S87 corresponds to a variable obtaining process that obtains a variable output from a map by inputting a sound signal corrected through the response correcting process to the map.

In step S89, the center CPU 64 executes a cause identifying process that identifies, based on the output variable y obtained in step S87, the generation cause of the sound picked up by the microphone 35. The processing content of step S89 is substantially equal to that of step S75 and thus will not be described in detail. In the present embodiment, step S89 corresponds to the first cause identifying process. After identifying the generation cause of the sound, the center CPU 64 advances the process to step S113.

In step S91, the center CPU 64 inputs the time-series data of the sound signal and the time-series data of the state variables of the vehicle 10, which were obtained in step S67, to the map as the input variable x. That is, the center CPU 64 inputs a sound signal that has not been corrected through the response correcting process to the map as the input variable x. In step S93, the center CPU 64 obtains the output variable y output from the map. Step S93 corresponds to a variable obtaining process that obtains a variable output from the map by inputting the sound signal that has not been corrected through the response correcting process to the map. The output variable y obtained in step S93 corresponds to a third output variable.

When the acquisition of the output variable y is completed in step S93, the center CPU 64 advances the process to step S95. In step S95, the center CPU 64 uses the output variable y obtained in step S93 to identify the generation cause of the sound picked up by the microphone 35. The processing content of step S95 is substantially equal to that of step S75 and thus will not be described in detail.

In step S97, the center CPU 64 sets a counter F to 1. Then, the center CPU 64 advances the process to step S99.

In step S99, the center CPU 64 executes a response correcting process that corresponds to the counter F. For example, when the counter F is 1, the center CPU 64 executes a response correcting process Z(1) based on the frequency response of the microphone 35 being A-weighted. Further, for example, when the counter F is 2, the center CPU 64 executes a response correcting process Z(2) based on the frequency response of the microphone 35 being B-weighted. Furthermore, for example, when the counter F is 3, the center CPU 64 executes a response correcting process Z(3) based on the frequency response of the microphone 35 being A-weighted plus. The response correcting process Z(1) is a response correcting process that allows the frequency response of the sound signal to approach that of the learning sound signal when the frequency response of the microphone 35 is A-weighted. The response correcting process Z(2) is a response correcting process that allows the frequency response of the sound signal to approach that of the learning sound signal when the frequency response of the microphone 35 is B-weighted. The response correcting process Z(3) is a response correcting process that allows the frequency response of the sound signal to approach that of the learning sound signal when the frequency response of the microphone 35 is A-weighted plus.

In step S101, the center CPU 64 inputs the time-series data of the corrected sound signal corrected in step S99 and the time-series data of the state variables of the vehicle 10 obtained in step S67 to the map as an input variable x(F). In step S103, the center CPU 64 obtains the output variable y of the map. For example, when the response correcting process Z(1) is referred to as the first response correcting process, the output variable y of the map in which the counter F is 1 corresponds to the first output variable. Further, for example, when the response correcting process Z(2) is referred to as the second response correcting process, the output variable y of the map in which the counter F is 2 corresponds to the second output variable.

In step S105, the center CPU 64 uses the output variable y obtained in step S103 to identify the generation cause of the sound picked up by the microphone 35. The processing content of step S105 is substantially equal to that of step S75 and thus will not be described in detail.

In step S107, the center CPU 64 increments the counter F by 1. In step S109, the center CPU 64 determines whether the counter F is greater than or equal to a determination value Fth. The determination value Fth is set to the value of the number of types of the frequency responses of the microphones stored in the model data 73 of FIG. 2. In the example of FIG. 2, since the number of the types of the frequency responses of the microphones is 5, the determination value Fth needs to be set to 5. When determining that the counter F is greater than or equal to the determination value Fth (S109: YES), the center CPU 64 advances the process to step S111. When determining that the counter F is less than the determination value Fth (S109: NO), the center CPU 64 advances the process to step S99.

In step S111, the center CPU 64 executes a cause selecting process that selects the generation cause of noise. That is, the center CPU 64 selects one of the generation causes identified in step S95 and the generation cause identified in step S105. For example, the center CPU 64 selects the generation cause of the sound by taking a majority vote in the identified generation causes. When the selection of the generation cause of the noise is completed, the center CPU 64 advances the process to step S113.

In step S113, the center CPU 64 causes the center communication device 61 to send the information related to the identified generation cause of the sound to the mobile terminal 30. Then, the center CPU 64 temporarily ends the series of processes.

After the terminal CPU 41 of the terminal controller 39 obtains the information related to the sound sent from the data analysis center 60, the terminal CPU 41 notifies the occupant of the generation cause of the sound indicated by that information. For example, the terminal CPU 41 displays the generation cause on the display screen 33.

Map Learning Method

Figure 7:
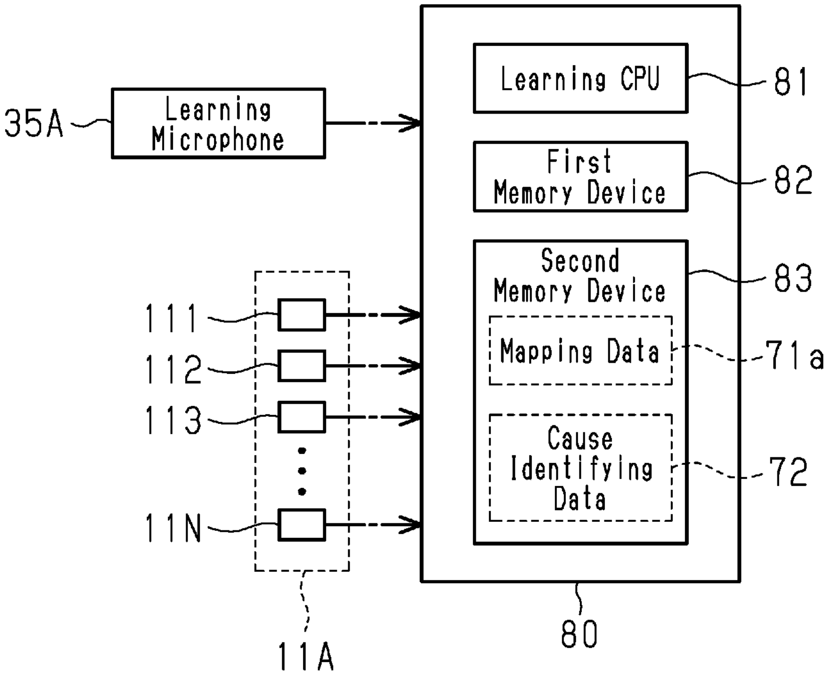
FIG. 7 is a block diagram showing the configuration of a learning device that executes machine learning on the map of FIG. 1.

A learning device 80 that executes machine learning on the map will now be described with reference to FIG. 7.

The learning sound signal, which is related to the sound picked up by the learning microphone 35A, is input to the learning device 80. Further, detection signals are input to the learning device 80 from a learning detection system 11A. One or more sensors included in the learning detection system 11A are the same as one or more sensors included in the detection system 11 of the vehicle 10.

The learning device 80 includes a learning CPU 81, a first memory device 82, and a second memory device 83. The first memory device 82 is memory circuitry that stores control programs executed by the learning CPU 81. The second memory device 83 is memory circuitry that stores the cause identifying data 72 and mapping data 71*a*, which defines a map that has not undergone machine learning.

Prior to machine learning on the map, the learning device 80 obtains multiple types of training data. The training data includes input variables of the map and a learning generation cause. The learning generation cause is the generation cause of the sound picked up by the learning microphone 35A. The input variables of the map include the time-series data of the learning sound signal and the time-series data of the state variables of the vehicle 10.

The learning CPU 81 of the learning device 80 obtains the output variables y(1) to y(M) of the map by inputting the time-series data of the learning sound signal included in the training data and the time-series data of the state variables to the map as input variables. Subsequently, the learning CPU 81 identifies the generation cause of the sound based on the output variables y(1) to y(M) in the same manner as step S75. Then, the learning CPU 81 compares the identified generation cause of the sound with the learning generation cause included in the training data. When the identified generation cause of the sound is different from the learning generation cause, the learning CPU 81 adjusts various variables included in the function approximator of the map such that one of the output variables y(1) to y(M) that corresponds to the learning generation cause becomes larger. For example, when the learning generation cause is the first generation cause candidate, the learning CPU 81 adjusts the variables included in the function approximator of the map such that the output variable y(1) of the output variables y(1) to y(M) becomes the largest.

When such machine learning on the map is completed, the second memory device 66 of the data analysis center 60 stores the mapping data 71, which defines the map that has undergone the machine learning.

Operation of Present Embodiment

When the microphone 35 picks up the noise generated in the vehicle 10, the terminal CPU 41 of the terminal controller 39 obtains the sound signal related to the sound picked up by the microphone 35. Then, the terminal controller 39 sends the sound signal and the state variables of the vehicle 10 to the center controller 63. The terminal controller 39 also sends the model information related to the microphone 35 to the center controller 63.

The center CPU 64 of the center controller 63 uses the obtained model information related to the microphone 35 to correct the frequency response of the sound signal. There is a case in which the model of the microphone 35 is different from that of the learning microphone 35A (S69: NO) but the model information related to the microphone 35 is included in the model data 73 (S81: YES). In this case, the center CPU 64 executes the response correcting process corresponding to the model of the microphone 35 to correct the sound signal such that the frequency response of the sound signal approaches that of the learning sound signal. Subsequently, the center CPU 64 identifies the generation cause of the sound based on the output variable y output from the map by inputting the corrected sound signal to the map.

When the model of the microphone 35 is the same as that of the learning microphone 35A (S69: YES), the center CPU 64 inputs a non-corrected sound signal to the map. Then, the center CPU 64 identifies the generation cause of the sound based on the output variable y output from the map.

When the model information related to the microphone 35 is not included in the model data 73 (S81: NO), the center CPU 64 identifies the generation cause candidate of the sound based on the output variable y output from the map by inputting the non-corrected sound signal to the map. This generation cause is referred to as a cause candidate Zr. Further, the center CPU 64 identifies Fth generation cause candidates by repeatedly executing the processes from step S99 to step S109 of FIG. 6. Then, the center CPU 64 identifies the generation cause of the sound based on the cause candidate Zr and the Fth generation cause candidates.

After identifying the generation cause of the sound picked up by the microphone 35, the center CPU 64 sends the information related to the identified generation cause to the mobile terminal 30. Then, the terminal CPU 41 of the terminal controller 39 notifies the owner of the mobile terminal 30 (i.e., the occupant of the vehicle 10) of the generation cause of the sound. The terminal CPU 41 notifies the occupant of the vehicle 10 of the generation cause of the sound using a predetermined hardware of the mobile terminal 30 (e.g., the display screen 33 of the mobile terminal 30, a vibration device, or an audio device).

Advantages of Present Embodiment (1-1) When the model of the microphone 35 is different from that of the learning microphone 35A (S69: NO) but the model information related to the microphone 35 is included in the model data 73 (S81: YES), the sound signal is corrected through the response correcting process corresponding to that model (S83). Thus, the frequency response of the sound signal input to the map approaches that of the learning sound signal. This reduces the variations in the frequency response of the sound signal that result from the difference in the model of the microphone 35 that picks up the sound. Then, the output variable y output from the map by inputting the corrected sound signal to the map is used to identify the generation cause of the sound picked up by the microphone 35 (S85 to S89). This reduces the variations in the accuracy of identifying the generation cause of the sound corresponding to the model of the microphone 35.

(1-2) The center controller 63 can execute the response correcting processes corresponding to the models of multiple types of microphones. Thus, the sound signal can be corrected through the response correcting process corresponding to the model of the microphone 35 by identifying that model. Then, the corrected sound signal is input to the map. This further reduces the variations in the accuracy of identifying the generation cause of the sound corresponding to the model of the microphone 35.

(1-3) When the model of the microphone 35 is the same as that of the learning microphone 35A (S69: YES), the response correcting process is not executed. This prevents the response correcting process from being executed unnecessarily and thus limits an increase in the processing load on the center CPU 64 of the center controller 63.

(1-4) When the model information related to the microphone 35 is not included in the model data 73 (S81: NO), the processes of steps S91 to S109 of FIG. 6 are executed to identify a relatively large number of generation cause candidates. From the candidates, the generation cause of the sound is identified. For example, the generation cause of the sound is identified through majority voting. Accordingly, even if the model information related to the microphone 35 is not included in the model data 73, a decrease in the accuracy of identifying the generation cause of the sound is limited.

(1-5) The model data 73 is stored in the second memory device 66 of the center controller 63. The series of processes illustrated in FIGS. 5 and 6 are executed by the center CPU 64 of the center controller 63. Thus, in a case in which the mobile terminal of a new model is on the market, the model data 73 can be immediately updated. Further, a response correcting process corresponding to the model of a new microphone is readily available. Accordingly, even if noise is picked up by the microphone of the mobile terminal of such a latest model, the accuracy of identifying the generation cause of the sound is relatively high.

A noise generation cause identifying method and a noise generation cause identifying device according to a second embodiment will now be described with reference to FIG. 8. The second embodiment is different from the first embodiment in that the memory device of the vehicle controller stores mapping data and the like. The differences from the first embodiment will mainly be described below. Like or the same reference numerals are given to those components that are the same as the corresponding components of the first embodiment. Such components will not be described.

Figure 8:
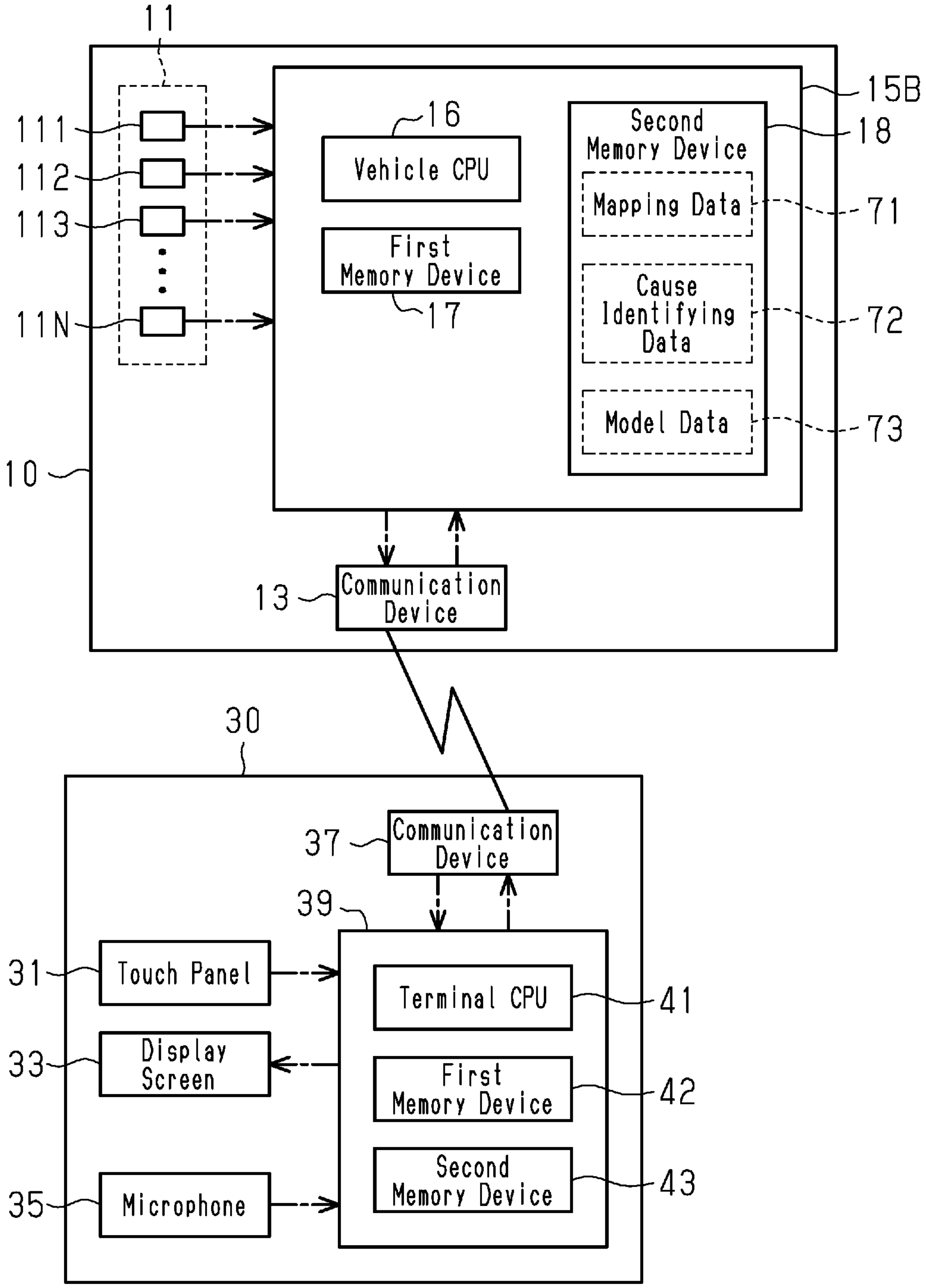
FIG. 8 is a block diagram showing the configuration of a system according to a second embodiment instead of FIG. 1.

FIG. 8 shows a system that includes the vehicle 10 and the mobile terminal 30.

The vehicle 10 includes the detection system 11, the vehicle communication device 13, and a vehicle controller 15B. The vehicle controller 15B includes the vehicle CPU 16, the first memory device 17, and the second memory device 18. The second memory device 18 stores the mapping data 71, the cause identifying data 72, and the model data 73 in advance.

The mobile terminal 30 includes the touch panel 31, the display screen 33, the microphone 35, the terminal communication device 37, and the terminal controller 39.

Noise Generation Cause Identifying Method

In the system of FIG. 8, the second memory device 18 of the vehicle controller 15B stores the mapping data 71, the cause identifying data 72, and the model data 73. Thus, the terminal CPU 41 of the terminal controller 39 causes the terminal communication device 37 to send the model information related to the microphone 35 to the vehicle controller 15B. Further, the terminal CPU 41 causes the terminal communication device 37 to send the sound signal related to the sound picked up by the microphone 35 to the vehicle controller 15B.

After obtaining the sound signal from the terminal controller 39, the vehicle CPU 16 of the vehicle controller 15B executes processes that are equivalent to the processes of steps S69 to S113 in the series of processes illustrated in FIGS. 5 and 6. That is, the vehicle CPU 16 of the vehicle controller 15B identifies the generation cause of the sound.

In the present embodiment, the vehicle controller 15B and the terminal controller 39 are included in the example of the analysis device. The terminal CPU 41 of the terminal controller 39 and the vehicle CPU 16 of the vehicle controller 15B are included in the example of the execution circuitry of the analysis device. Of the terminal CPU 41 and the vehicle CPU 16, the terminal CPU 41 corresponds to the first execution circuitry and the vehicle CPU 16 corresponds to the second execution circuitry. The second memory device 18 of the vehicle controller 15B corresponds to the memory circuitry of the analysis device. Further, when the vehicle controller 15B is an example of the noise generation cause identifying device, the vehicle CPU 16 of the vehicle controller 15B corresponds to the execution circuitry of the noise generation cause identifying device. The second memory device 18 of the vehicle controller 15B corresponds to the memory circuitry of the noise generation cause identifying device.

Advantages of Present Embodiment

The present embodiment further provides the following advantage in addition to advantages equivalent to advantages (1-1) to (1-4) of the first embodiment.

(2-1) The second embodiment allows the generation cause of the sound picked up by the microphone 35 to be identified without sending the sound signal and the state variables of the vehicle 10 to the data analysis center 60, which is located outside of the vehicle 10. That is, even if communication between the mobile terminal 30 and the data analysis center 60 is unstable, the second embodiment allows the generation cause to be identified.

Modifications

The above embodiments may be modified as follows. The above embodiments and the following modifications can be combined as long as the combined modifications remain technically consistent with each other.

In the first embodiment, the response correcting process is executed by the center CPU 64 of the center controller 63. Instead, for example, the response correcting process may be executed by the terminal CPU 41 of the terminal controller 39 so that the terminal CPU 41 sends the sound signal corrected through the response correcting process to the center controller 63. In this case, it is preferred that the second memory device 43 of the terminal controller 39 store the model data 73.

In the second embodiment, the response correcting process is executed by the vehicle CPU 16 of the vehicle controller 15B. Instead, for example, the response correcting process may be executed by the terminal CPU 41 of the terminal controller 39 so that the terminal CPU 41 sends the sound signal corrected through the response correcting process to the vehicle controller 15B. In this case, it is preferred that the second memory device 43 of the terminal controller 39 store the model data 73.

In the embodiments, when the model of the microphone 35 is the same as that of the learning microphone 35A, the generation cause of the sound may be identified by executing processes that are equivalent to the processes of step S91 to S111 of FIGS. 5 and 6.

In the embodiments, when the model information related to the microphone 35 is included in the model data 73, the generation cause of the sound may be identified by executing processes that are equivalent to the processes of step S91 to S111 of FIGS. 5 and 6.

In the embodiments, when the model information related to the microphone 35 is not included in the model data 73, the generation cause of the sound may be identified based on the output variable y output from the map by inputting the non-corrected sound signal to the map. Alternatively, one of the response correcting processes is set as a specified response correcting process. When the model information related to the microphone 35 is not included in the model data 73, the generation cause of the sound may be identified based on the output variable y output from the map by inputting the sound signal corrected through the specified response correcting process to the map.

In the first embodiment, the terminal controller 39 sends the sound signal and the state variables of the vehicle 10 to the center controller 63. Instead, the terminal controller 39 may send the sound signal to the vehicle controller 15 and then the vehicle controller 15 may send the sound signal and the state variables to the center controller 63.

In the embodiments, the order of executing the processes of steps S91 to S109 of FIG. 6 may be changed. For example, the processes of steps S97 to S109 may be executed and then, after the determination of step S109 indicates YES, the processes of steps S91 to S95 may be executed.

In the embodiments, when the generation cause of the sound picked up by the microphone 35 is identified, the occupant of the vehicle 10 is notified of the identification result by the mobile terminal 30. Instead, for example, the occupant may be notified of the identification result by using a vehicle on-board device as a predetermined hardware.

In the embodiments, when the generation cause of the sound picked up by the microphone 35 is identified, the occupant of the vehicle 10 does not have to be notified of the identification result.

When a microphone is mounted on the passenger compartment of the vehicle 10, the generation cause of the sound picked up by that microphone may be identified.

Specifically, in the first embodiment, the vehicle CPU 16 of the vehicle controller 15 obtains the sound signal. Thus, the vehicle CPU 16 sends the sound signal to the data analysis center 60. In this case, since the vehicle controller 15 and the center controller 63 are included in the example of the analysis device, the vehicle CPU 16 of the vehicle controller 15 and the center CPU 64 of the center controller 63 are included in the example of the execution circuitry of the analysis device. Of the vehicle CPU 16 and the center CPU 64, the vehicle CPU 16 corresponds to the first execution circuitry and the center CPU 64 corresponds to the second execution circuitry.

Likewise, in the second embodiment, the vehicle CPU 16 of the vehicle controller 15B obtains the sound signal. In this case, since the vehicle controller 15B corresponds to the analysis device, the vehicle CPU 16 of the vehicle controller 15B corresponds to the execution circuitry of the analysis device.

Neural network is not limited to feedforward network having one intermediate layer. For example, neural network having two or more intermediate layers may be used. Alternatively, convolutional neural network or recurrent neural network may be used.

The learned model that has undergone machine learning is not limited to neural network. Instead, the learned model may be a support vector machine.

Each of the center controller 63, the terminal controller 39, and the vehicle controllers 15, 15B is not limited to a device that includes a CPU and a ROM and executes software processing. That is, these controllers may be modified as long as it has any one of the following configurations (a) to (c):

(a) Each controller includes one or more processors that execute various processes in accordance with a computer program. The processor includes a CPU and a memory, such as a RAM and ROM. The memory stores program codes or instructions configured to cause the CPU to execute the processes. The memory, or a non-transitory computer-readable medium, includes any type of media that are accessible by general-purpose computers and dedicated computers.

(b) The controller includes one or more dedicated hardware circuits that execute various processes. Examples of the dedicated hardware circuits include an application specific integrated circuit (ASIC) and a field programmable gate array (FPGA).

(c) The controller includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A noise generation cause identifying method for identifying a generation cause of noise, the generation cause identifying method comprising:

storing, by memory circuitry of an analysis device, mapping data that defines a map, wherein an input sound signal related to a sound picked up by an input microphone is input to the map and a variable related to a generation cause of a sound in a vehicle is output from the map, the map has undergone machine learning, a sound signal input to the map during the machine learning on the map is defined as a learning sound signal, and a microphone that picks up a sound indicated by the learning sound signal is defined as a learning microphone;

executing, by execution circuitry of the analysis device, a sound signal obtaining process that obtains the input sound signal related to the sound picked up by the input microphone;

obtaining, by the execution circuitry, model information related to a model of the input microphone;

executing, by the execution circuitry, a response correcting process that causes a frequency response of the input sound signal to approach a frequency response of the learning sound signal by correcting, based on the obtained model information, the input sound signal obtained through the sound signal obtaining process;

executing, by the execution circuitry, a variable obtaining process that obtains a variable output from the map by inputting the input sound signal corrected through the response correcting process to the map; and executing, by the execution circuitry, a cause identifying process that identifies, based on the variable obtained through the variable obtaining process, the generation cause of the sound picked up by the input microphone.

2. The noise generation cause identifying method according to claim 1, wherein the memory circuitry stores multiple types of the model information, the multiple types of the model information include first model information and second model information, the noise generation cause identifying method further comprises:

executing, by the execution circuitry, a first response correcting process of the response correcting process when the obtained model information is the first model information; and executing, by the execution circuitry, a second response correcting process of the response correcting process when the obtained model information is the second model information, and the first response correcting process causes the frequency response of the input sound signal to approach the frequency response of the learning sound signal by correcting the obtained sound signal based on the first model information, and the second response correcting process causes the frequency response of the input sound signal to approach the frequency response of the learning sound signal by correcting the obtained sound signal based on the second model information.

3. The noise generation cause identifying method according to claim 2, wherein when the obtained model information is not stored in the memory circuitry, the noise generation cause identifying method further comprises:

executing, by the execution circuitry, the first response correcting process and the second response correcting process;

obtaining, by the execution circuitry, the variable output from the map as a first output variable by inputting the input sound signal corrected through the first response correcting process to the map;

obtaining, by the execution circuitry, the variable output from the map as a second output variable by inputting the input sound signal corrected through the second response correcting process to the map;

obtaining, by the execution circuitry, the variable output from the map as a third output variable by inputting the input sound signal obtained through the sound signal obtaining process to the map; and executing, by the execution circuitry, a cause selecting process that selects the generation cause of the sound from a generation cause of the sound that is based on the first output variable, a generation cause of the sound that is based on the second output variable, and a generation cause of the sound that is based on the third output variable.

4. The noise generation cause identifying method according to claim 1, wherein the cause identifying process is a first cause identifying process, and when the model of the microphone indicated by the obtained model information is the same as a model of the learning microphone, the noise generation cause identifying method further comprises:

executing, by the execution circuitry, a reference variable obtaining process that obtains, as a reference variable, the variable output from the map by inputting the input sound signal obtained through the sound signal obtaining process to the map; and executing, by the execution circuitry, a second cause identifying process that uses the reference variable obtained through the reference variable obtaining process to identify the generation cause of the sound picked up by the input microphone.

5. The noise generation cause identifying method according to claim 1, wherein the execution circuitry includes first execution circuitry located in the vehicle or located in a mobile terminal owned by an occupant of the vehicle and second execution circuitry located outside of the vehicle, and the second execution circuitry executes the response correcting process, the variable obtaining process, and the cause identifying process.

6. A noise generation cause identifying method, comprising:

storing, by memory circuitry of an analysis device, mapping data that defines a map, wherein an input sound signal related to a sound picked up by an input microphone is input to the map and a variable related to a generation cause of a sound in a vehicle is output from the map, the map has undergone machine learning, a sound signal input to the map during the machine learning on the map is defined as a learning sound signal, and a microphone that picks up a sound indicated by the learning sound signal is defined as a learning microphone;

executing, by execution circuitry of the analysis device, a sound signal obtaining process that obtains the input sound signal related to the sound picked up by the input microphone;

obtaining, by the execution circuitry, model information related to a model of the input microphone;

executing, by the execution circuitry, a first response correcting process that corrects a frequency response of the input sound signal obtained through the sound signal obtaining process and, when the model information related to the input microphone is first model information, causes the frequency response of the input sound signal to approach a frequency response of the learning sound signal;

executing, by the execution circuitry, a second response correcting process that corrects the frequency response of the input sound signal obtained through the sound signal obtaining process and, when the model information related to the input microphone is second model information, causes the frequency response of the input sound signal to approach the frequency response of the learning sound signal;

executing, by the execution circuitry, a variable obtaining process that obtains, as a first output variable, a variable output from the map by inputting the input sound signal corrected through the first response correcting process to the map, obtains, as a second output variable, a variable output from the map by inputting the input sound signal corrected through the second response correcting process to the map, and obtains, as a third output variable, a variable output from the map by inputting the input sound signal obtained through the sound signal obtaining process to the map; and executing, by the execution circuitry, a cause selecting process that selects the generation cause of the sound from a generation cause of the sound that is based on the first output variable, a generation cause of the sound that is based on the second output variable, and a generation cause of the sound that is based on the third output variable.

7. The noise generation cause identifying method according to claim 6, wherein the execution circuitry includes first execution circuitry located in the vehicle or located in a mobile terminal owned by an occupant of the vehicle and second execution circuitry located outside of the vehicle, and the second execution circuitry executes the first response correcting process, the second response correcting process, and the cause selecting process.

8. A noise generation cause identifying device that identifies a generation cause of a sound picked up by an input microphone, the noise generation cause identifying device comprising execution circuitry and memory circuitry, wherein the memory circuitry stores mapping data that defines a map, an input sound signal related to the sound picked up by the input microphone is input to the map and a variable related to a generation cause of a sound in a vehicle is output from the map, the map has undergone machine learning, a sound signal input to the map during the machine learning on the map is defined as a learning sound signal, a microphone that picks up a sound indicated by the learning sound signal is defined as a learning microphone, and the execution circuitry is configured to execute:

a response correcting process that performs correction corresponding to model information related to a model of the input microphone so that a frequency response of the input sound signal related to the sound picked up by the input microphone approaches a frequency response of the learning sound signal;

a variable obtaining process that obtains a variable output from the map by inputting the input sound signal corrected through the response correcting process to the map; and a cause identifying process that identifies, based on the variable obtained through the variable obtaining process, the generation cause of the sound picked up by the input microphone.

9. A noise generation cause identifying device that identifies a generation cause of a sound picked up by an input microphone, the noise generation cause identifying device comprising execution circuitry and memory circuitry, wherein the memory circuitry stores mapping data that defines a map, an input sound signal related to the sound picked up by the input microphone is input to the map and a variable related to a generation cause of a sound in a vehicle is output from the map, the map has undergone machine learning, a sound signal input to the map during the machine learning on the map is defined as a learning sound signal, a microphone that picks up a sound indicated by the learning sound signal is defined as a learning microphone, and the execution circuitry is configured to execute:

a first response correcting process that corrects a frequency response of the input sound signal related to the sound picked up by the input microphone and, when model information related to the input microphone is first model information, causes the frequency response of the input sound signal to approach a frequency response of the learning sound signal;

a second response correcting process that corrects the frequency response of the input sound signal and, when the model information related to the input microphone is second model information, causes the frequency response of the input sound signal to approach the frequency response of the learning sound signal;

a variable obtaining process that obtains, as a first output variable, a variable output from the map by inputting the input sound signal corrected through the first response correcting process to the map, obtains, as a second output variable, a variable output from the map by inputting the input sound signal corrected through the second response correcting process to the map, and obtains, as a third output variable, a variable output from the map by the input sound signal that has not been corrected to the map; and a cause selecting process that selects the generation cause of the sound from a generation cause of the sound that is based on the first output variable, a generation cause of the sound that is based on the second output variable, and a generation cause of the sound that is based on the third output variable.

* * * * *